United States Patent

O'Sullivan et al.

[15] 3,699,127

[45] Oct. 17, 1972

[54] PLASTICIZED CYANOACRYLATE ADHESIVE COMPOSITIONS

[72] Inventors: Denis J. O'Sullivan; Bernard J. Bolger, both of Dublin, Ireland

[73] Assignee: Loctite (Ireland), Limited, Dublin, Ireland

[22] Filed: Oct. 7, 1970

[21] Appl. No.: 78,948

[30] Foreign Application Priority Data

Oct. 10, 1969 Ireland ..................... 1406/69

[52] U.S. Cl. ............................. 260/33.2, 260/17 R
[51] Int. Cl. ........................................... C08g 51/34
[58] Field of Search .................................. 260/33.2

[56] References Cited

UNITED STATES PATENTS

| | | | |
|---|---|---|---|
| 2,721,858 | 10/1955 | Jayner et al. | 260/67 |
| 3,603,889 | 10/1961 | Tamblyn et al. | 106/188 |
| 2,784,127 | 4/1957 | Jayner et al. | 154/43 |
| 2,784,215 | 4/1958 | Jayner et al. | 260/465.4 |

FOREIGN PATENTS OR APPLICATIONS

| | | |
|---|---|---|
| 758,306 | 10/1956 | Great Britain |
| 837,227 | 9/1960 | Great Britain |
| 559,677 | 9/1958 | Canada |
| 494,812 | 1/1946 | Canada |

*Primary Examiner*—Allan Lieberman
*Assistant Examiner*—Richard Zaitlen
*Attorney*—J. Rodney Reck and William J. Daniel

[57] ABSTRACT

Adhesive compositions containing polymerizable esters of α-cyanoacrylic acid are imparted improved properties by incorporating therein a diaryl or an alkyl aryl ether as a bond plasticizer.

13 Claims, No Drawings

PLASTICIZED CYANOACRYLATE ADHESIVE COMPOSITIONS

BACKGROUND OF THE INVENTION

Adhesive compositions containing esters of α-cyanoacrylic acid have found extensive utility in applications where rapid cure speed is advantageous. On most metal, glass and rubber parts, as well as on many plastics, significant bond strength generally can be obtained within a matter of minutes, and generally within a matter of seconds. Substantially full cure of the adhesive bond commonly is achieved within about an hour.

As with all adhesives, and particularly with rapidly curing adhesives, bond plasticizers are highly desirable additives. Bond plasticizers are substances which by their presence in an adhesive bond, diminish or suppress the tendency of the bond to become brittle, and therefore weak and unreliable when aged. Bond plasticizers are particularly important for bonds which are aged under the influence of mechanical shock or vibration.

As cyanoacrylate adhesives can cure by both a free radical and an anionic mechanism, they are extremely sensitive; care must be taken in selecting additives for use therein. Generally, Lewis bases (compounds capable of donating electron pairs to a second atom) are to be avoided since these commonly serve as initiators for anionic polymerization. Hence, the location of suitable plasticizers for cyanoacrylate adhesives has not been an easy task. The most commonly cited plasticizers in the prior art are organic esters of aliphatic mono- and dicarboxylic acids, diesters of phthalic acid, and organic phosphate. The most commonly used commercial plasticizers have been diesters of sebacic acid. See for example, U.S. Pat. No. 2,784,127 to Joyner et al., issued Mar. 5, 1957.

It would be a major improvement in the art to prepare useful cyanoacrylate adhesive compositions which contained bond plasticizers other than the plasticizers of the prior art.

THE INVENTION

This invention concerns adhesive compositions which contain at least one polymerizable ester of α-cyanoacrylic acid and, as a bond plasticizer, an aryl or a diaryl ether. It also concerns the method for improving a cyanoacrylate adhesive which comprises incorporating therein a bond plasticizer of the type described above.

The invention also involves bonded assemblies having increased resistance to bond failure, particularly under the influence of mechanical shock or vibration, which comprise two or more substrates bonded by means of an adhesive composition of the type described above, as well as the method of preparing adhesive assemblies by the use of such adhesive.

DESCRIPTION OF THE INVENTION AND ITS PREFERRED EMBODIMENTS

It was surprising to find that the ether plasticizers described herein could be successfully incorporated into cyanoacrylate adhesives without destroying the shelf stability thereof. The electron pairs on the ethereal oxygen normally would be expected to produce stability problems in the adhesive during its normally useful life, e.g., 6 months or more. While applicants do not intend to be bound to any particular theory, it is possible that the delocalization of the electrons of the ethereal oxygen due to the presence of the one or two aryl groups adjacent thereto, (i.e., the aromatic ring of the aryl group or groups being directly bonded to the ethereal oxygen) serves to render the plasticizers safe for use in the adhesive composition.

Generally, the aryl ether will have the formula $R^1OR^2$, wherein $R^1$ is an aryl group, and $R^2$ is an organic radical containing up to about 20 carbon atoms. Preferably, $R^1$ is an aryl group containing up to about 20 carbon atoms, and most preferably a phenyl group, including phenyl groups containing from one to five substituents selected from the class consisting of chlorine, bromine and $C_1$ to about $C_{20}$ alkyl radicals. Preferably $R^2$ is hydrocarbon group, and most preferably is selected from the same radicals as $R^1$, defined above, or is an alkyl group containing from one to about 20 carbon atoms. Naturally, either of $R^1$ and $R^2$ can contain any substituents which do not adversely affect the aryl ether for its intended use herein, and such compounds are considered within the scope of this invention. In its most highly preferred embodiment, both $R^1$ and $R^2$ are aryl groups containing up to about 15 carbon atoms.

Some benefit will be achieved by the use of essentially any proportion of aryl ether in the cyanoacrylate adhesives of this invention, but the general range of use is between 0.25 percent and 15 percent by weight of the adhesive composition. Preferably, this use range is between 0.5 percent and about 10 percent by weight of the adhesive composition. As a general rule, below the 0.25 percent level, the benefits are not significant; and above about 15 percent by weight, the presence of the plasticizer can affect adversely the strength of the cured bond.

The esters of α-cyanoacrylic acid which are used in the invention described herein can be prepared by the method described in U.S. Pat. No. 2,467,927 to Ardis, issued Apr. 19, 1949. This method involves the preparation of an intermediate polymer through the condensation reaction between formaldehyde and an ester of cyanoacetic acid. The condensation reaction is promoted by a basic condensation catalyst, such as ammonium hydroxide, quinoline, piperidine and diethyl amine. Moderate warming, such as to about 50° C to initiate the reaction, also may be desirable. Water and organic solvents are removed, generally by distillation, following which the intermediate polymer is thermally decomposed to produce the monomeric ester of α-cyanoacrylic acid. The monomeric ester is separated by fractional distillation at a reduced pressure of 1 to 10 millimeters of mercury absolute pressure, or less, generally in the presence of acidic polymerization inhibitor such as phosphorous pentoxide. The monomer vapors are condensed into a vessel which contains the desired inhibitors for use in the final adhesive product, as discussed more fully below. Other similar manufacturing processes are disclosed, for example, in U.S. Pat. Nos. 2,721,858 to Joyner et al., issued Oct. 25, 1955, and 3,254,111 to Hawkins et al., issued May 31, 1966.

Generally, the ester of α-cyanoacrylic acid corresponds to the general formula

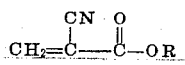

where R is a $C_1$ to about $C_{16}$ alkyl, alkenyl, cyclohexyl or phenyl group. In the adhesive composition, the esters of α-cyanoacrylic acid can be used singly or in combination. Preferably, a single ester is used, selected from the group consisting of $C_1$ to about $C_5$ alkyl, allyl and cyclohexyl esters of α-cyanoacrylic acid. The single most desirable esters are methyl- and ethyl-α-cyanoacrylate.

Additionally, the adhesive compositions commonly contain one or more polymerization inhibitors. The most important is an inhibitor of anionic polymerization. The inhibitor used in the earlier commercial formulations was an acidic gas, most generally sulfur dioxide, at a level of about 0.001 percent to about 0.06 percent by weight. See, for example, U.S. Pat. No. 2,794,788 to Coover et al., issued June 4, 1957.

Other more recent formulations have utilized sultone stabilizers, organic heterocyclic compounds containing an $-S(O_2)-$ group in the heterocyclic ring. These compounds may be represented by the general formula

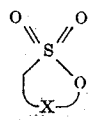

wherein X is a hydrocarbon group joining the $-S(O_2)O-$ group in a four, five or six member heterocyclic ring, and preferably a five member heterocyclic ring. Since the presence of the characteristic $-S(O_2)O-$ group of the sultone is the critical factor, the hydrocarbon group X can contain any substituents or linkages which do not adversely affect the sultone for use as a stabilizer in the adhesive composition. Most preferably, X may be represented by the formula

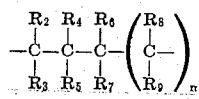

wherein n is either 0 or 1, and each of $R^2$ through $R^9$, inclusive, is selected from the group consisting of hydrogen, alkyl or alkenyl of one to about eight carbon atoms, bromo, chloro and hydroxyl groups, and aromatic or fused aromatic rings. Contemplated within this definition are compounds where more than one of $R^2$ through $R^9$, inclusive, and the connecting carbon atoms are joined in aromatic or fused aromatic rings. Typical examples of sultone stabilizers are 1,8-naphthosultone and propane sultone. See, for example, British Pat. No. 1,196,069 to O'Sullivan published June 24, 1970. Other suitable inhibitors of this type, particularly if extremely long shelf stability is not essential, are soluble organic acids, and particularly organic sulfonic acids. Inhibitors described in this paragraph generally are used at levels between about 0.1 percent to about 10 percent by weight of the adhesive composition, and preferably between about 0.5 percent and about 5 percent by weight.

While not absolutely necessary, it is generally desirable to include an inhibitor of free radical polymerization in the cyanoacrylate adhesive composition since, like most acrylate type monomers, the cyanoacrylate monomer is subject to attack by free radicals. While many inhibitors of free radical polymerization are known, the most desirable are those of the phenolic type such as quinone, hydroquinone, p-t-butyl catechol, p-methoxy phenol, 2:6-di-t-butyl-para cresol and 2,2-methylene-bis-(4-methyl-6-t-butyl) phenol. These inhibitors may be used at concentrations from about 0.001 percent to about 1 percent by weight of the adhesive composition. Most preferably, they are used in the range of about 0.005 percent to about 0.1 percent by weight of the adhesive composition.

It is frequently beneficial to incorporate certain other ingredients in the adhesive composition to impart specific characteristics to the liquid adhesive or the cured adhesive product. For example, it is generally desirable to use a thickener to make the adhesive composition more viscous (such as about 25 to about 150 centipoise), and thus more capable of retention on the parts to be bonded. Without such thickeners, much of the adhesive may drain from the part prior to cure. A number of such thickeners are known for use in combination with cyanoacrylate adhesives, the most common of which are acrylate resins such as polymethylmethacrylate and polyethylmethacrylate. Other suitable thickeners include polymeric alklcyanoacrylates, cellulose esters such as cellulose acetate and cellulose butyrate, and polyvinyl ethers such as polyvinylmethyl ether.

All of the above named ingredients, including the ether plasticizer, generally may be incorporated in the adhesive composition by normal mixing at room temperature.

When the adhesive composition is used to bond substrates, a thin coating of the cyanoacrylate adhesive is applied to at least one of the substrates to be bonded. The other substrate is placed in contact therewith as rapidly as possible, applying at least moderate pressure perpendicular to the bond line. The parts are held in fixed relationship until the adhesive has cured sufficiently to retain the parts without outside assistance. As indicated above, substantially full cure is achieved in nearly all cases within about 1 hour.

EXAMPLES

The following Examples are given to demonstrate the preparation and use of adhesive compositions within the scope of the invention disclosed herein, and are not intended to be limitations upon the invention. Unless stated to the contrary, all ratios and percentages in the Examples are on a weight basis.

EXAMPLE I

Two cyanoacrylate adhesives were prepared from methyl-α-cyanoacrylate monomer. Adhesive Composition A was prepared by adding to the monomer 3 percent by weight of the alkylated diphenyl ether sold by Bayer A.G. of Leverkusen, Germany, under the trade name "Diphyl DT," an ether plasticizer within the scope of the invention disclosed herein. Adhesive Composition B was identical to Adhesive Composition A, except that 3 percent by weight dioctyl sebacate, a prior art plasticizer, was substituted for the ether plasticizer.

Adhesive Compositions A and B then were used to bond the ends of ¼ inch diameter butyl rubber cord stock. The tensile force required to break the bonds 30 seconds after assembly was determined. The average bond strength for each adhesive was found to be 110 Kg/cm².

Adhesive Compositions A and B then were stored for 6 months at 20° C, whereupon the above tests were repeated. The average bond strength for Adhesive Composition A was found to be 100 Kg/cm², whereas for Adhesive Composition B it was found to be 20 Kg/cm².

EXAMPLE II

Adhesive Compositions C and D of this invention and E of the prior art were prepared by mixing the following ingredients in the weight percentages indicated:

| Component | Adhesive Composition | | |
|---|---|---|---|
| | C | D | E |
| Methyl-α-cyanoacrylate | 93.3 | 93.3 | 93.3 |
| Polymethylmethacrylate | 4.7 | 4.7 | 4.7 |
| Diphenyl ether | 2.0 | — | — |
| Diphyl DT of Example I | — | 2.0 | — |
| Dioctyl sebacate | — | — | 2.0 |

Adhesive Compositions C, D and E then were used to bond standard steel lap strips (Test ASTM D-1002-65) and standard steel impact blocks (Test ASTM D-950-54). The assemblies then were stored for approximately 3 months, after which the tensile shear force required to separate the bonded lap strips, and the impact force required to separate the impact blocks were measured. The results were as follows:

| Adhesive Composition | Tensile Shear Strength (Kg/cm²) | Impact Strength (Kg-cm/cm²) |
|---|---|---|
| C | 180 | 6 |
| D | 174 | 6 |
| E | 186 | 5.5 |

EXAMPLE III

Adhesive Compositions F, G and H were used in the tests of this Example, their compositions being as follows, expressed in weight percentages:

| Component | Adhesive Composition | | |
|---|---|---|---|
| | F | G | H |
| Methyl-α-cyanoacrylate | 97 | 97 | 97 |
| Diphyl DT of Example I | 3 | — | — |
| Diphenyl ether | — | 3 | — |
| 4,4'-di(chloromethyl)-diphenyl ether | — | — | 3 |

Each of Adhesive Compositions F, G and H then was used to bond steel lap strips and steel impact blocks, according to the tests of Example II. One half of each group of assembled specimens were used in the tests of Example II between about 15 and about 30 minutes after assembly to determine the tensile-shear strength and the impact strength of the bonds. The other half of each group of the assembled specimens were stored at room temperature for approximately 8 months, at which time the tensile-shear and the impact strength of these bonds were determined. For each composition there was no significant difference between the tensile-shear strengths and the impact strengths of the specimens tested within 30 minutes after assembly vis-a-vis the specimens stored for 8 months.

EXAMPLE IV

Adhesive Compositions F, G and H of Example III, above, were stored at room temperature for 6 months. Thereafter, the tensile-shear and impact tests of Example II were conducted with each Composition, in each case measuring the bond strength within about 30 minutes after assembly. After 6 months' storage, each of Adhesive Compositions F, G and H demonstrated substantially the same bond strengths as when fresh.

What is claimed is:

1. An adhesive composition which comprises at least one polymerizable ester of α-cyanoacrylic acid, and from about 0.25 percent to about 15 percent by weight of the composition of at least one ether plasticizer selected from the group consisting of aryl and diaryl ethers wherein the aromatic ring of each aryl group is directly bonded to the ethereal oxygen.

2. The adhesive composition of claim 1 wherein the ether plasticizer has the formula $$R^1OR^2$$

wherein $R^1$ is an aryl group and $R^2$ is an organic radical containing up to about 20 carbon atoms.

3. The adhesive composition of claim 2 wherein $R^1$ contains up to about 20 carbon atoms and $R^2$ is a hydrocarbon group.

4. The adhesive composition of claim 3 wherein each of $R^1$ and $R^2$ is an aryl group containing up to about 20 carbon atoms.

5. The adhesive composition of claim 4 wherein each of $R^1$ and $R^2$ is a phenyl radical, each containing up to 5 substitutents selected from the class consisting of chlorine, bromine and $C_1$ to about $C_{20}$ alkyl radicals.

6. The adhesive composition of claim 5 wherein the ether plasticizer comprises from about 0.5 percent to about 10 percent by weight of the composition.

7. The adhesive composition of claim 1 wherein the ester of α-cyanoacrylic acid has the formula

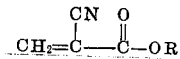

wherein R is a $C_1$ to about $C_{16}$ alkyl, alkenyl, cyclohexyl or phenyl group.

8. The adhesive composition of claim 7 wherein the ester of α-cyanoacrylic acid is methyl-α-cyanoacrylate or ethyl-α-cyanoacrylate.

9. The adhesive composition of claim 1 which additionally contains an inhibitor of anionic polymerization.

10. The adhesive composition of claim 9 which additionally contains an inhibitor of free radical polymerization.

11. The method of improving a cyanoacrylate ester adhesive composition which comprises adding thereto from about 0.25 percent to about 15 percent by weight of the composition of an aryl or diaryl ether plasticizer, wherein the aromatic ring of each aryl group is directly bonded to the ethereal oxygen.

12. In the process of bonding substrates with a cyanoacrylate ester adhesive composition, the improvement wherein the adhesive composition comprises a cyanoacrylate ester of the formula

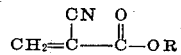

wherein R is a $C_1$ to about $C_{16}$ alkyl, alkenyl, cyclohexyl or phenyl group; and from about 0.25 percent to about 15 percent by weight of said composition of an aryl or diaryl ether plasticizer wherein the aromatic ring of each aryl group is directly bonded to the ethereal oxygen.

13. The method of claim 11 wherein the adhesive composition comprises an ester of α-cyanoacrylic acid having the formula

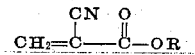

wherein R is a $C_1$ to about $C_{16}$ alkyl, alkenyl, cyclohexyl or phenyl group, an inhibitor of anionic polymerization and an inhibitor of free radical polymerization.

* * * * *